(12) United States Patent
McCabe

(10) Patent No.: US 6,190,122 B1
(45) Date of Patent: Feb. 20, 2001

(54) INTAKE AND EXHAUST AIR DAMPER WITH MOVABLE MOTOR FAN ASSEMBLY

(76) Inventor: Francis J. McCabe, #6 Bunker Hill Rd., Ottsville, PA (US) 18942

(*) Notice: Under 35 U.S.C. 154(b), the term of this patent shall be extended for 0 days.

This patent is subject to a terminal disclaimer.

(21) Appl. No.: 09/368,370

(22) Filed: Aug. 4, 1999

Related U.S. Application Data

(63) Continuation-in-part of application No. 08/990,201, filed on Dec. 13, 1997, now Pat. No. 6,030,179, and a continuation-in-part of application No. 09/008,042, filed on Jan. 16, 1998, now Pat. No. 6,039,533, and a continuation-in-part of application No. 09/012,263, filed on Jan. 23, 1998, now Pat. No. 6,010,307.

(51) Int. Cl.[7] .............................. F04D 29/38; F04D 25/10
(52) U.S. Cl. ....................... 415/146; 415/147; 415/150; 415/157; 416/223 R; 416/228; 416/237; 454/353
(58) Field of Search .............................. 416/235, 236 R, 416/237, 223 R, 228, 197 R, 197 A, 197 B, 23, 24, 132 R, 132 B, DIG. 4; 244/198, 218; 415/148, 150, 151, 157, 158, 146, 147; 454/350, 351, 353, 259

(56) References Cited

U.S. PATENT DOCUMENTS

| 1,508,086 | * | 9/1924 | Crawford | 416/237 |
|---|---|---|---|---|
| 1,818,607 | * | 8/1931 | Campbell | 416/237 |
| 3,589,268 | * | 6/1971 | Steiner | 454/350 |
| 3,827,482 | * | 8/1974 | Pope | 416/236 R |
| 4,445,426 | * | 5/1984 | Bohanon, Sr. | 454/351 |
| 4,594,940 | * | 6/1986 | Wolbrink et al. | 454/353 |
| 4,655,122 | * | 4/1987 | McCabe | 454/353 |
| 4,859,140 | * | 8/1989 | Passadore | 415/157 |
| 5,599,172 | * | 2/1997 | McCabe | 417/334 |
| 5,711,653 | * | 1/1998 | McCabe | 416/237 |
| 5,827,044 | * | 10/1998 | Yazici et al. | 415/150 |
| 6,010,307 | * | 1/2000 | McCabe | 416/237 |
| 6,030,179 | * | 2/2000 | McCabe | 416/237 |
| 6,039,533 | * | 3/2000 | McCabe | 415/146 |

FOREIGN PATENT DOCUMENTS

| 58-150734 | * | 9/1983 | (JP) | 454/353 |
|---|---|---|---|---|
| 39960 | * | 1/1937 | (NL) | 416/197 A |
| 9201866 | * | 2/1992 | (WO) | 415/4.4 |

* cited by examiner

Primary Examiner—Christopher Verdier
(74) Attorney, Agent, or Firm—Frank J. Benasutti

(57) ABSTRACT

An intake and exhaust fan assembly is provided having a motor and fan assembly mounted for movement on rails toward and away from a rotatable blade damper mounted on an angle to the motor/fan assembly.

6 Claims, 12 Drawing Sheets

INTAKE AND EXHAUST AIR DAMPER
WITH MOVABLE MOTOR FAN ASSEMBLY

CROSS-REFERENCE TO RELATED APPLICATION

This application is a continuation-in-part of my prior patent applications Ser. No. 08/990,201 filed Dec. 13, 1997 entitled AIRFOIL STRUCTURES AND METHOD now U.S. Pat. No. 6,030,179 and Ser. No. 09/008,042, filed Jan. 16, 1998, entitled FAN BLADE, STRUCTURES AND METHODS, now U.S. Pat. No. 6,039,533 and Ser. No. 09/012,263, filed Jan. 23, 1998, entitled PROPELLER, STRUCTURES AND METHODS, now U.S. Pat. No. 6,010, 307 the disclosures of which are incorporated herein by reference as if fully set forth.

FIELD OF INVENTION

This invention relates to a motorized fan and air damper preferably for use with intake and exhaust air flow into and out of a building, and more particularly to such a device in which the motor driving the fan is movable toward and away from the damper.

BACKGROUND ART

In the prior art, it is known to have louvered dampers 100 as shown in FIG. 13 with rotatable movable blades 102 in FIG. 13. These dampers are amounted in the wall 104 in FIG. 13 of a building to exhaust the air from the interior of the building or to draw air into the interior of the building. Typically, these dampers have a manual motorized actuating device to open the laterally disposed slats or blades of the damper in order to permit the intake or outflow of air. Further, there could have been a motor 106 FIG. 13 mounted on the interior of the building driving a fan proximate to the rear of the damper to draw in air or to blow air out. In such a case, it was common to have a bell mouthed shroud 108 FIG. 13 juxtaposed between the blades of the fan and the rear 110 FIG. 13 of the damper. A portion of the bell mouth was positioned in very close proximity to the tips 114 FIG. 13 of the blades in order to provide a partial seal and thereby provide pressurization. The same was true of the configuration for air intake fans. In each case, the motors were fixedly mounted with respect to the bell mouthed damper box shroud 108.

DISCLOSURE OF THE INVENTION

SUMMARY OF THE INVENTION

My invention comprises a number of features in this type of apparatus which enhance its functioning. In particular, I provide a motor for driving the fan blades; which motor is mounted on rails which are connected to the fan box. The motor slides along the rails toward and away from the fan box in accordance with the preferred embodiments. Also provided are fan blades with trailing lips (to be described more fully hereinafter) which enhance the efficiency of the air flow in the mechanism. The motor is so connected and arranged on rails which are angled with respect to the damper box frame, such that the force of the weight of motor applied through a linkage actuates the blades in the damper to open and close the damper. In particular, an intake fan assembly is described having a motor and fan means mounted for movement toward and away from a rotatable blade damper; said motor and fan means being mounted on an obtuse angle (i.e. upward slope) to said damper frame for intake air movement through said damper. Alternatively, an exhaust fan assembly is provided having a motor and fan means mounted for movement toward and away from a rotatable blade damper; said motor and fan means being mounted on an acute angle (i.e. downward slope forward) to said damper when viewed from the side.

DESCRIPTION OF THE PREFERRED EMBODIMENTS

Figure 9:
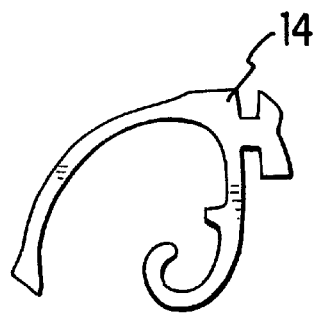
FIG. 9 is an end view of a pivotal mounting device for each of the blades of a damper shown in the prior figures.
Figure 10:
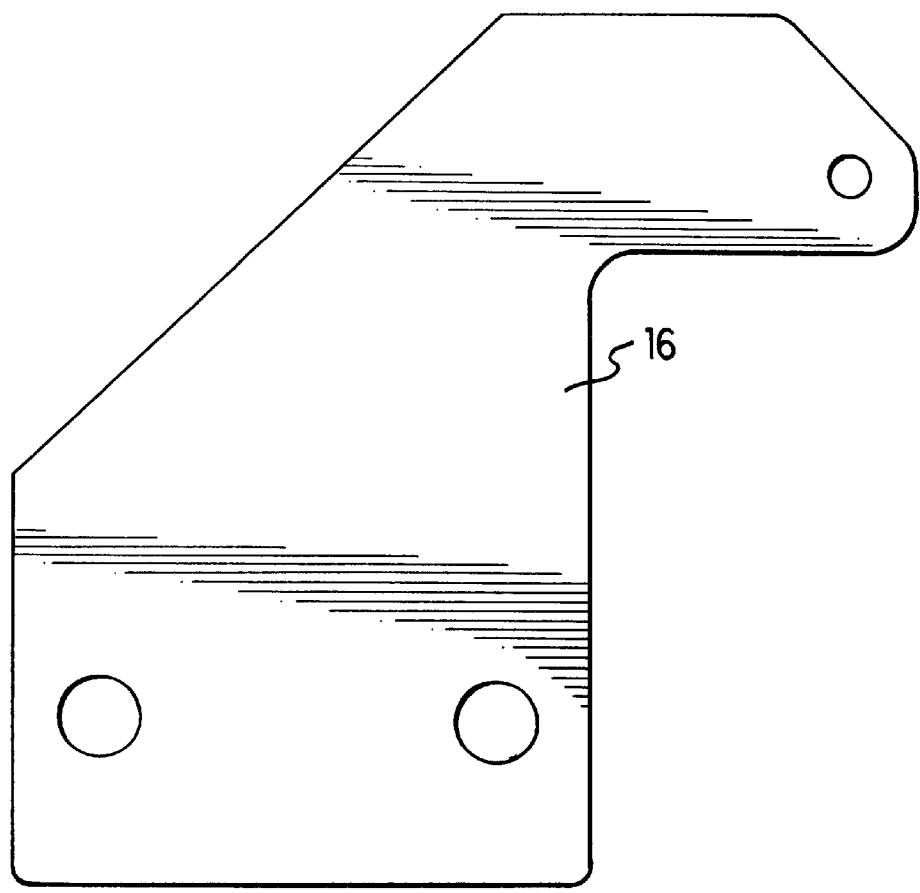
FIG. 10 is a plan view of a blade bracket.
Figure 11:
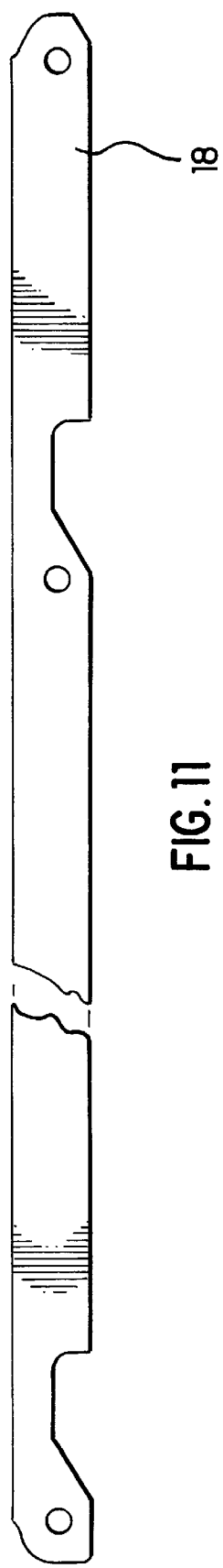
FIG. 11 is a plan view of a blade bar.

In referring to FIGS. 1 through 4, a fan damper box motor assembly is shown in accordance with my invention for use as an exhaust fan means. This comprises a multi-blade damper 10 having a plurality of horizontally disposed pivotally mounted blades 12 mounted therein so as to be actuated to swing to an open position (shown) or to a closed position. The blades may be conveniently mounted to perform this function to blade hangers 14 such as the one shown in end view in FIG. 9. Attached at one end of each blade, by any suitable means (not shown), is a blade bracket 16, such as that shown in FIG. 10. At the other end, each bracket is pivotally mounted to a blade bar 18, FIG. 11. It will be understood that as the bar 18 is raised and lowered vertically (when viewed as in FIG. 2), the blades will either swing closed or opened.

Figure 5:
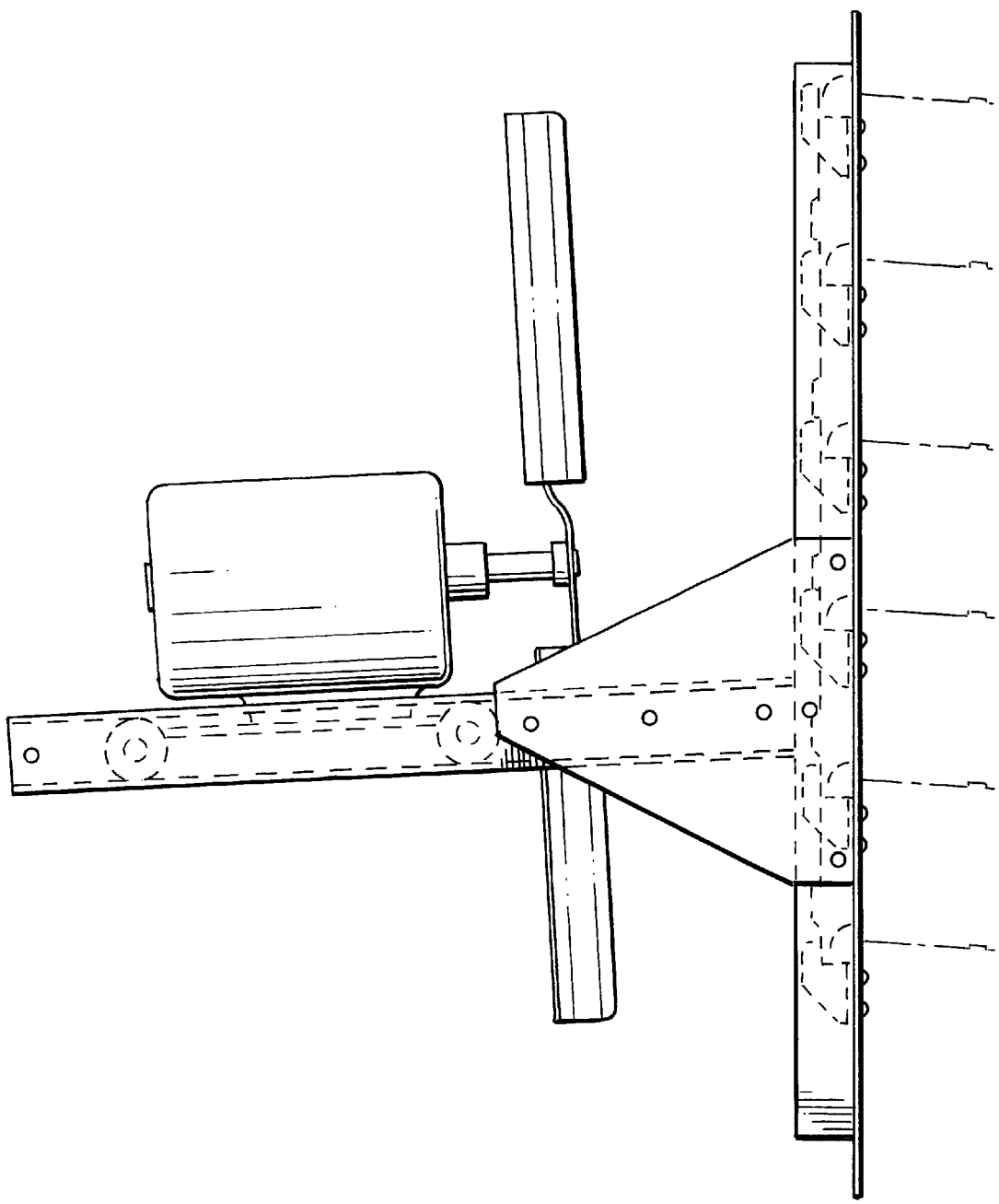
FIG. 5 shows a side elevation of an alternate embodiment of my invention.
Figure 6:
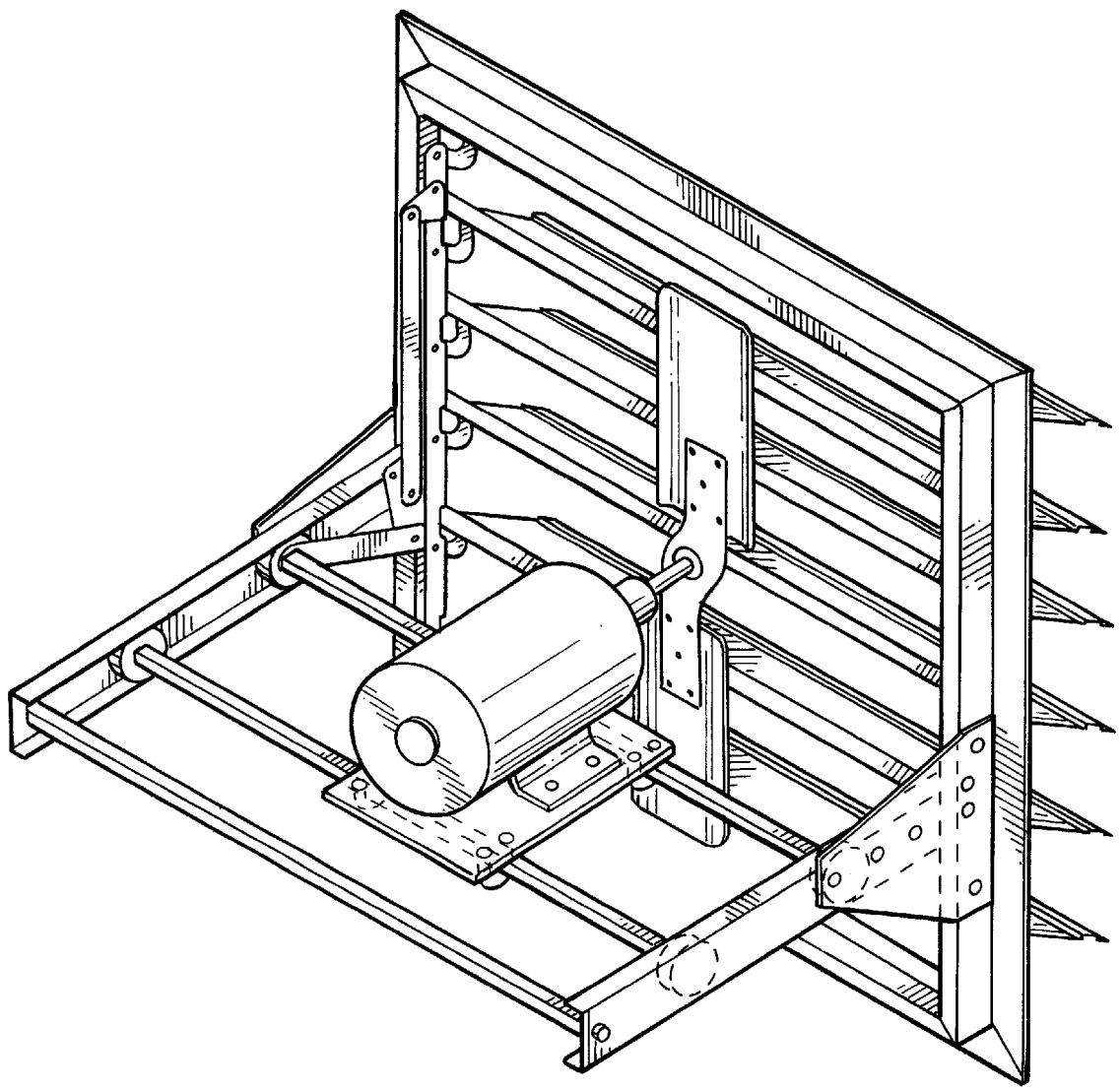
FIG. 6 shows a perspective view of the device shown in FIG. 5.
Figure 7:
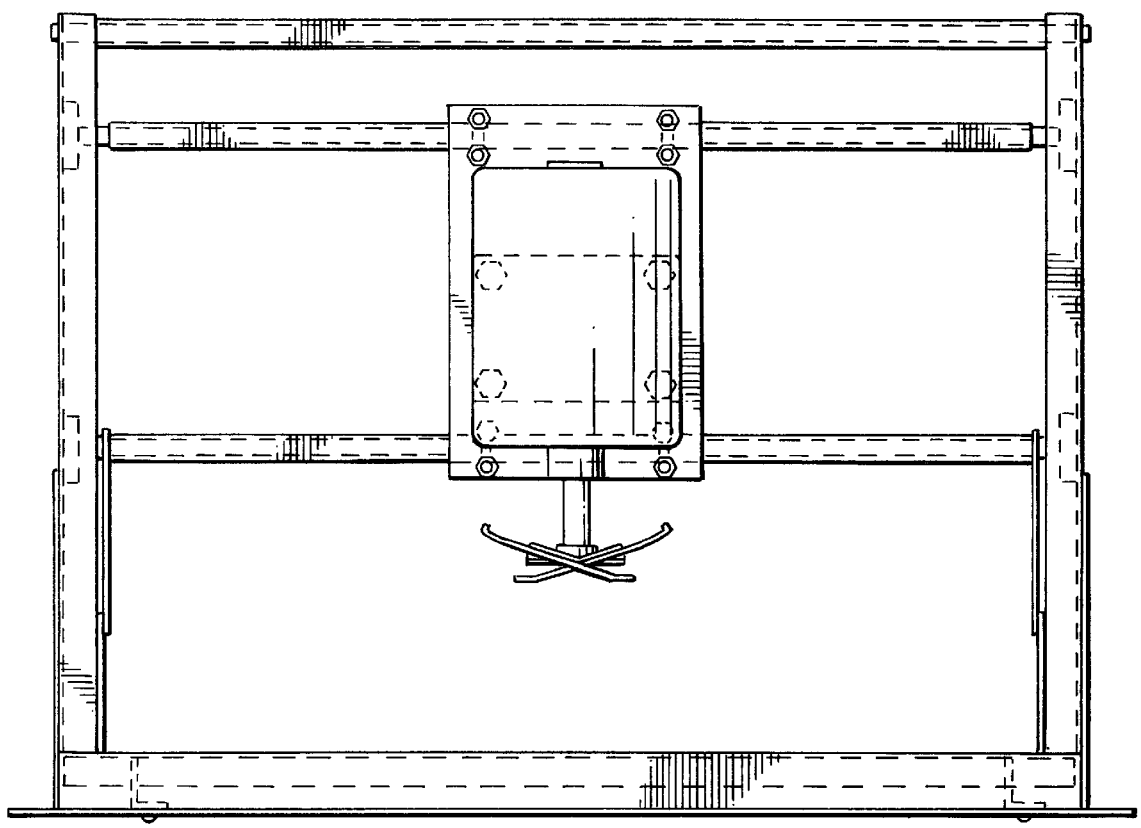
FIG. 7 shows a top view of the device shown in FIG. 5.
Figure 8:
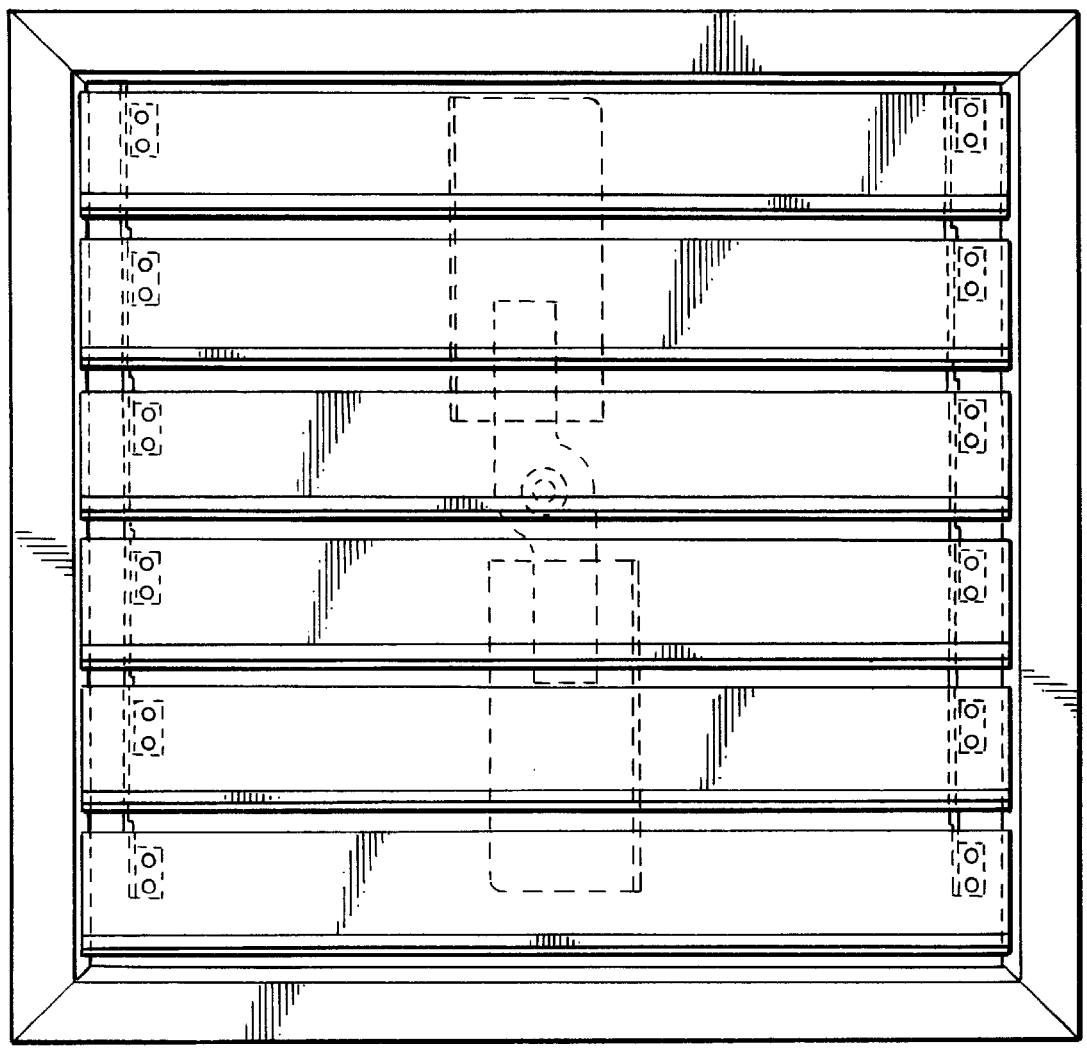
FIG. 8 shows a front view of the device shown in FIG. 5.

To cause this is occur, a drag link 20 is provided pivotally connected at one end to the blade bar 18 and at the other end to a pivotally mounted lever arm 22. The lever arm 22 provides three pivotal holes, one of which is mounted to the frame so as to provide the vertical movement aforesaid when the lever arm is rotated about the hole which is mounted to the frame. Another of the holes is connected to the actuator 24 at one end thereof; thus causing pivotal movement in response to movement of said actuator. The other end of the actuator has a rod 26 mounted thereto in such a manner that it can rotate about the rod 26. The rod is one of a plurality of rods 26, 28, upon which is fixedly mounted a base plate 30. The motor 32 is fixedly mounted to the base plate 30. Each of the rods 26 and 28 terminate in bearing wheels 34 which track in rails 36 so as to ride along the rails. The rails are fixedly attached to the frame of the damper as, for example, by bolster plates 38. A support bar 40 is also provided fixedly attached to the rails in order to maintain the relative position between them. The connection between the rails 36 and the bolster plate is such that in the intake air fan position shown in FIG. 5, the angle of a plane perpendicular to the fan damper box 10 and the plane through the longitudinal axis of the rails 36 is approximately three degrees. The rails 36 are below the horizontal, as shown in FIG. 5, providing an upward slope toward the damper box frame.

Figure 1:
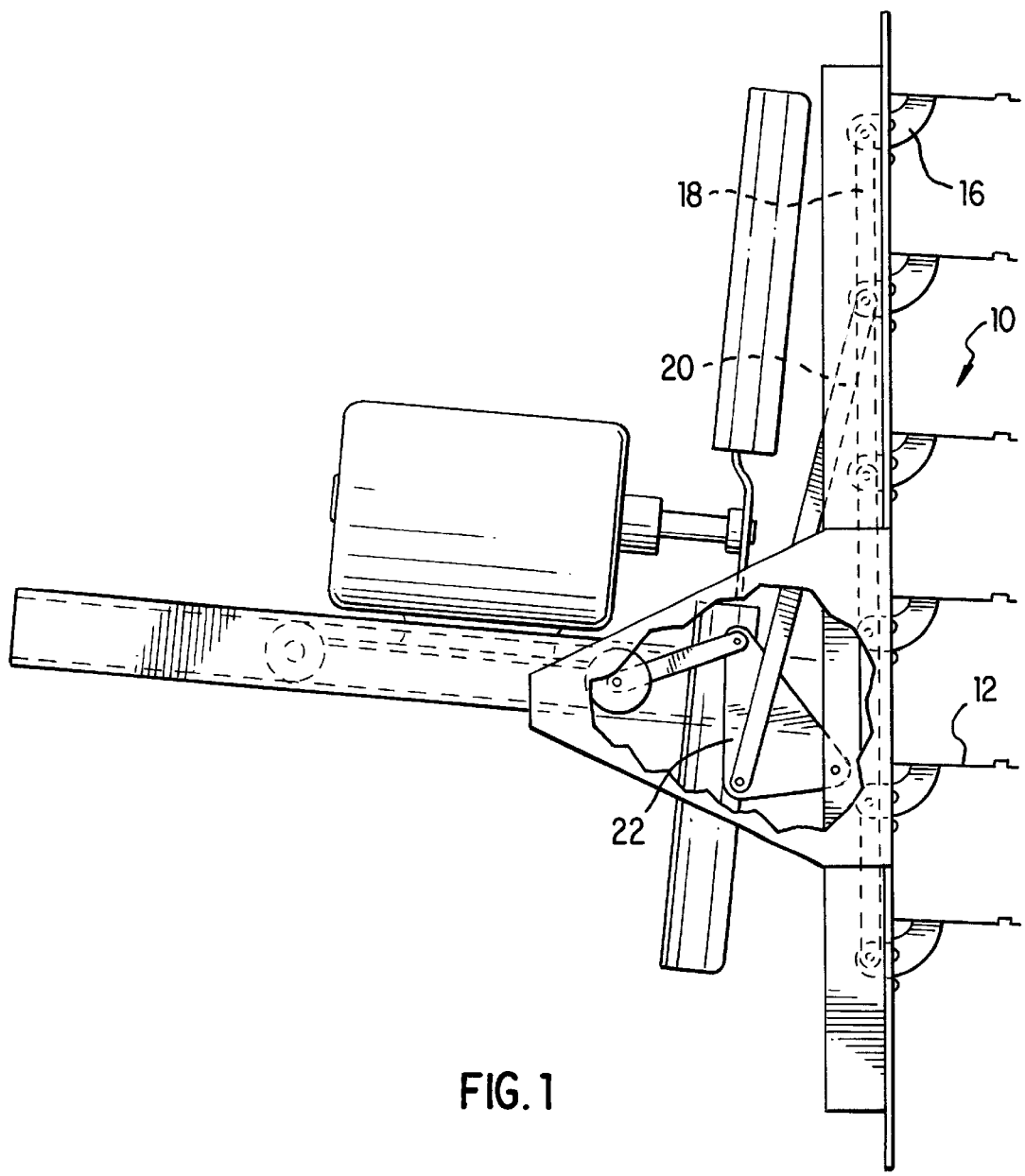
FIG. 1 shows a side elevation of a motorized fan and multi-blade damper box partially broken away to show a portion of the mechanism in accordance with my invention.

In the exhaust fan alternate embodiment, that three degree angle between the plane of the rails 36 and a horizontal plane above the horizontal and provides a slope of the rails downward toward the damper box frame, as shown in FIG. 1.

Mounted to the shaft 42 of the motor 32 is a fan blade assembly. This assembly comprises a fan blade hub 44 to which a plurality of fan blades 46 are mounted. The hub has a hub portion which can be keyed to the motor shaft and set with a set screw or any other suitable means so as to rotate therewith.

Figure 12:
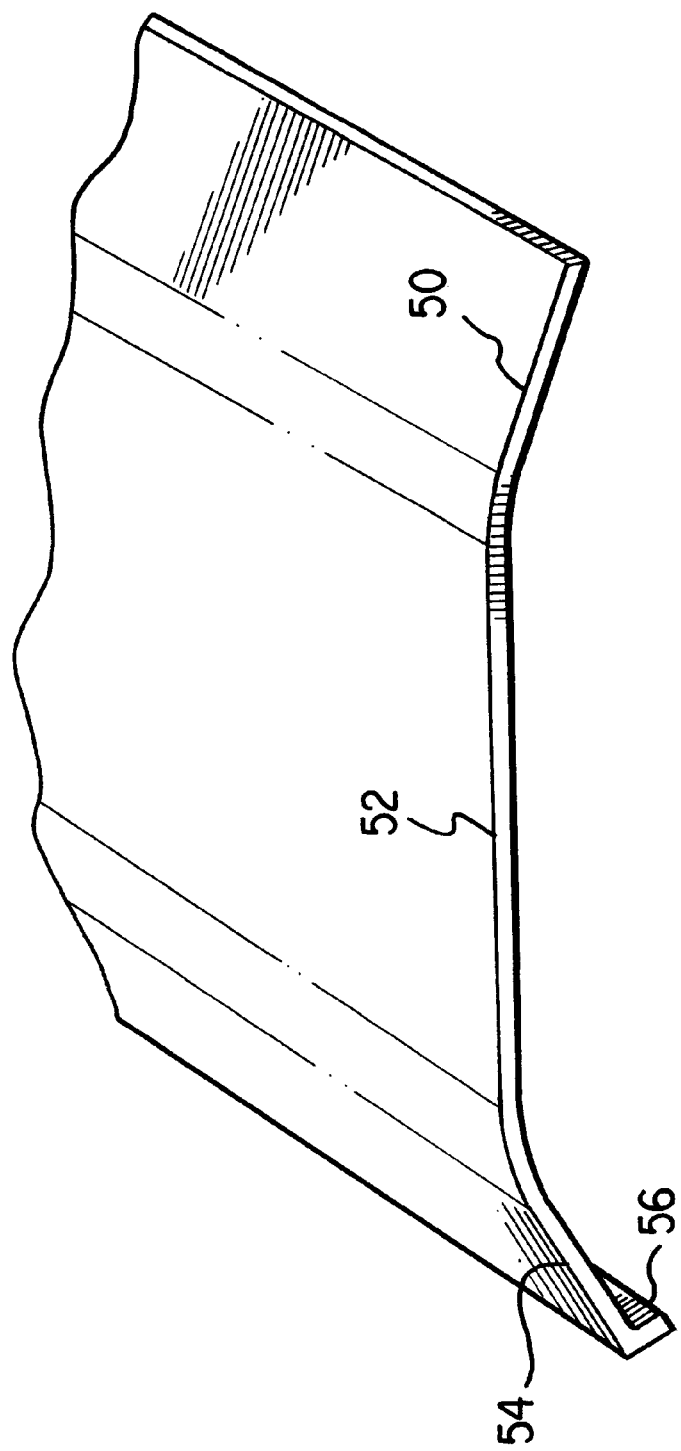
FIG. 12 is a partial perspective view of a portion of a blade.
Figure 13:
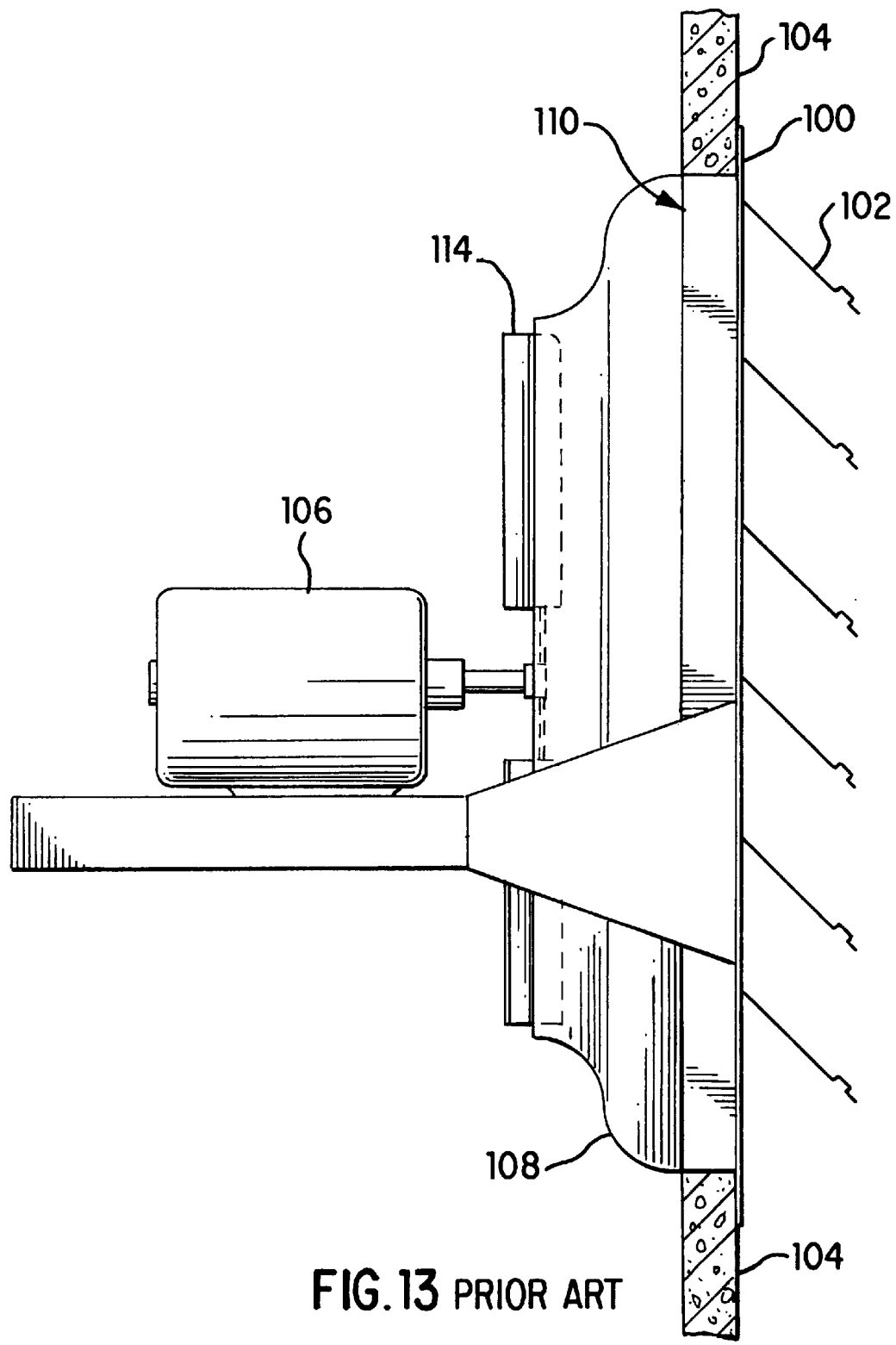
FIG. 13 is an elevation of a prior art device shown mounted in a wall.

As shown in FIG. 12, a typical fan blade has a cross-section in the preferred embodiment of my invention resembling a pan-shaped structure with a leading edge portion 50, an intermediate portion 52, a trailing edge portion 54, and a lip 56. The entire structure is most preferably of uniform thickness and made of sheet metal so as to be planar to give the advantages of my blade structure described in my prior pending applications and issued patents.

Figure 2:
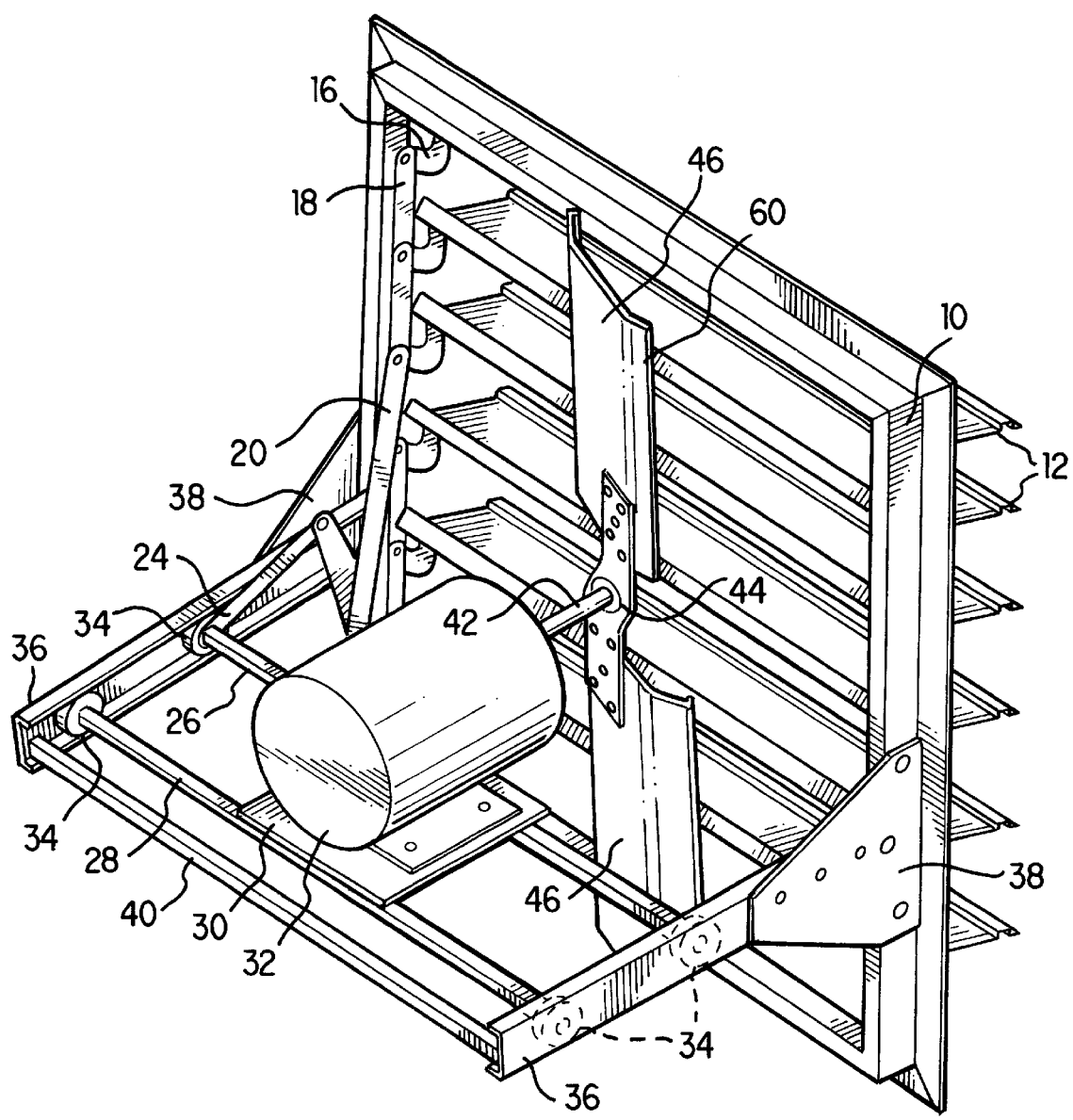
FIG. 2 shows a perspective view of the device shown in FIG. 1.
Figure 3:
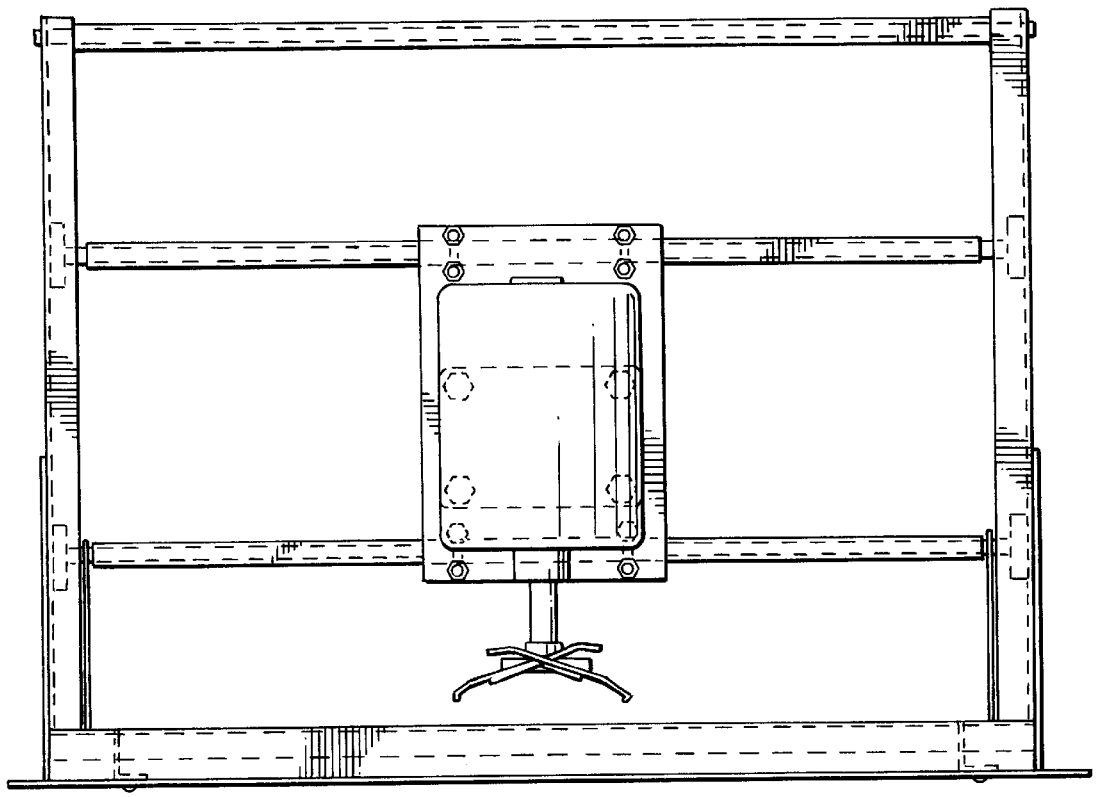
FIG. 3 shows a top view of the device shown in FIG. 1.
Figure 4:
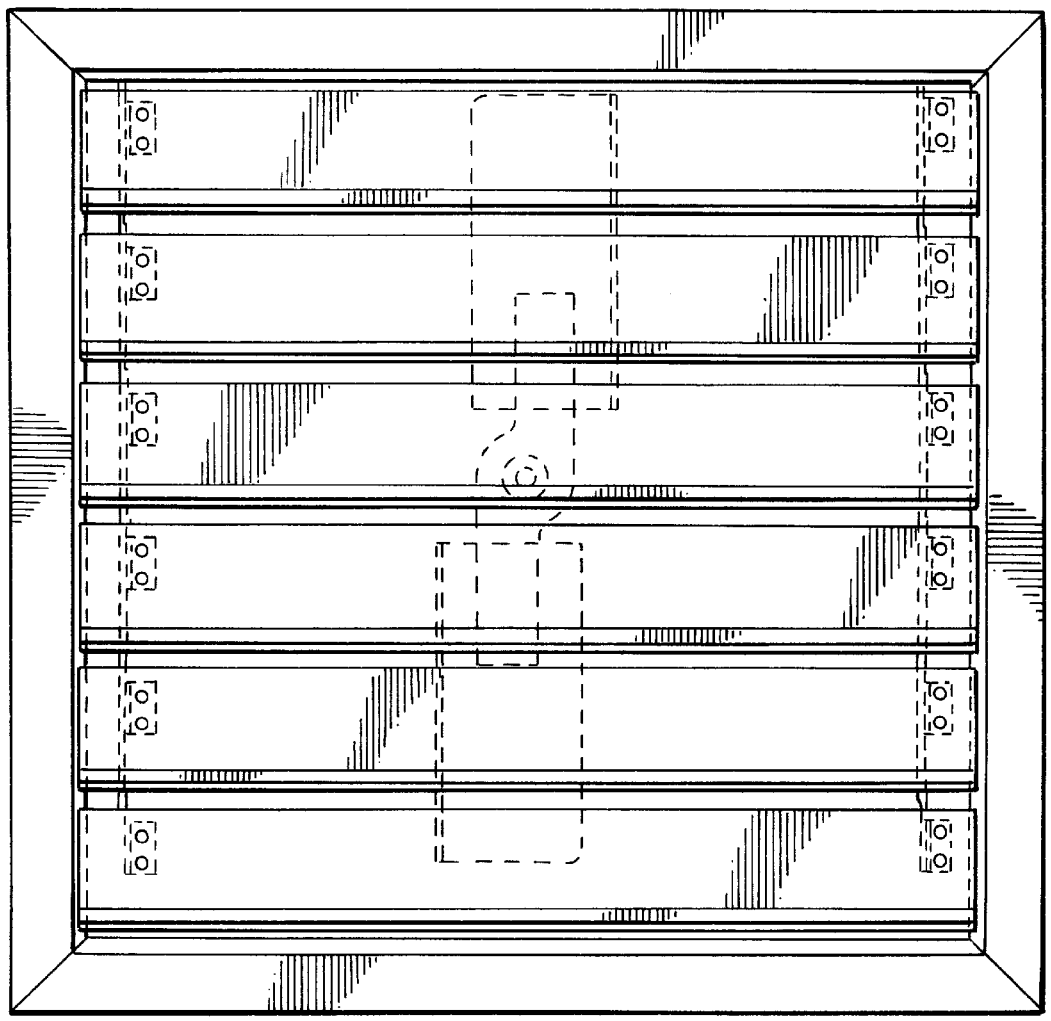
FIG. 4 shows a front elevation of the device shown in FIG. 1.

In the exhaust fan, these blades are mounted so that you would not see the inside of the trailing edge if you viewed the device from the rear, i.e., the interior of the building as shown in FIG. 2. The concave top blade faces the damper box; with the leading edge of the top blade to the right. In this Figure, the device is set up for a motor having a clockwise rotation, and thus the leading edge 60, FIG. 2, would set the angle of attack into the surrounding air. When turned off, the motor is carried by gravity to the bottom of the downward slope, where a stop (not shown) prevents the fan blades from engaging the back of the damper box.

In operation, when the motor is turned on, the fan blades rotate clockwise and the air generated by them creates a thrust of air against the back of the damper. This automatically forces open the multiple blades 12 of the damper by virtue of the linkage mechanism. The air flow is exhausted from the building and as the motor rolls backward, uphill on the rails. The inner-connected pivotally mounted parts 18, 20, 22 and 24 cause the blades to open.

If one were to reverse the blades from hub to tip so that the leading edge of the top blade when in a vertical position was to the left, one should reverse the direction of rotation of the motor as well to counterclockwise.

In the modification of the device shown in FIGS. 5 through 8, it will be noted that the angle between the rails and the damper fan box of three degrees forms a slope upward. As such, when the motor is turned off, it will rest by gravity at the lower most or left most position when viewed as in FIG. 5. When the motor is turned on, the thrust is to the rear or left sucking air in through the blades of the damper; which are now raised vertically against the air flow the damper is opened. The motor/fan assembly climbs the upward slope toward the damper box from the position shown in FIG. 5 to that shown in FIG. 6. Here, the blades have been positioned so that their concave shapes face the motor. The top blade, when in the vertical position, has its leading edge to the left. See FIG. 7. The fan rotates counterclockwise. Here again, if one were to change the direction of rotation to clockwise, they would also need to change the blades from tip to root.

In both of the embodiments, two principles apply. First, in the arrangement of the configuration of the concave portion of the blade air thrust is created in much the same way as air thrust in a propeller of an airplane. Thus, in the exhaust position, the thrust is to the left driving the motor and fan assembly up the incline slope while pushing air out of the building to the right. In the intake position, the fan blade thrust is to the right. Thus, it drags the motor and fan assembly up the incline while simultaneously opening the blades.

In both cases, the incline slope together with the forces of gravity on the rolling motor and fan assembly provide the same effect as a spring would; only a spring would wear out. Thus, the weight of the motor pushing down the slope in the exhaust position through the linkage forces the blades open while in the intake position, the linkage also forces the blades open. Obviously, the pivot points would have to be arranged as could be done within the ordinary skill in the art given this disclosure so that the linkage would work as aforesaid.

Thus, the incline creates the default position just as a spring would. Furthermore, because of the force of gravity when the motor is turned off, the motor rolls to a position which pulls on the linkage and closes the rotating blade damper.

From what has been described, it will be noted that I have provided a means for automatically opening and closing an intake or exhaust damper without the need for a separate motor to open the rotatable blades of the damper.

Furthermore, with no bell mouthed restricting the air flow, more air can be removed from the building and more air is entrained to be pulled into the building in the intake fan configuration.

What is claimed is:

1. An intake fan assembly having a motor and fan means mounted for movement toward and away from a damper having rotatable blades; said motor and fan means being mounted at an obtuse angle to said damper.

2. The fan assembly according to claim 1 wherein the motor and fan means is mounted on rails to slide toward and away from said damper; and a linkage means is provided connecting the motor and fan means to the blades of the damper to cause movement of said blades upon movement of said motor and fan means.

3. The intake fan assembly of claim 1 wherein said motor and fan means comprises a plurality of fan blades mounted to a shaft of a motor for rotation therewith, said fan blades being configured in transverse cross-section such as to have a concave portion and a convex portion and one longitudinal edge thereof comprising a leading edge and an other longitudinal edge thereof comprising a trailing edge, said trailing edge having a lip extending along the longitudinal edge at an angle of approximately 90 degrees back toward the leading edge; and said assembly is such that the concavity of the blades faces the motor.

4. An exhaust fan assembly having a motor and fan means mounted for movement toward and away from a damper having rotatable blades; said motor and fan means being mounted at an acute angle to said damper.

5. The exhaust fan assembly of claim 4 comprising a plurality of fan blades mounted to a shaft of a motor for rotation therewith, said fan blades being configured in transverse cross-section such as to have a concave portion and a convex portion and one longitudinal edge thereof comprising a leading edge and an other longitudinal edge thereof comprising a trailing edge, said trailing edge having a lip extending along the longitudinal edge at an angle of approximately 90 degrees back toward the leading edge; and said assembly is such that the concavity of the blades faces the damper.

6. The fan assembly according to claim 4 wherein the motor and fan means is mounted on rails to slide toward and away from said damper; and a linkage means is provided connecting the motor and fan mans to the blades of the damper to cause movement of said blades upon movement of said motor and fan means.

* * * * *